United States Patent [19]

Moore et al.

[11] Patent Number: 4,485,619
[45] Date of Patent: Dec. 4, 1984

[54] NOSE BULLET ANTI-ICING FOR GAS TURBINE ENGINES

[75] Inventors: Alan Moore; Geoffrey E. Harman; David G. Rosser; Edward F. Clapham, all of Briston, England

[73] Assignee: Rolls-Royce Limited, London, England

[21] Appl. No.: 416,277

[22] Filed: Sep. 9, 1982

Related U.S. Application Data

[63] Continuation of Ser. No. 138,143, Apr. 7, 1980, abandoned.

[30] Foreign Application Priority Data

Apr. 17, 1979 [GB] United Kingdom ............... 7913292

[51] Int. Cl.³ .............................................. F01D 5/08
[52] U.S. Cl. ................................ 60/39.093; 415/175; 416/95
[58] Field of Search ............... 60/39.093; 244/134 R; 415/175, 177; 416/95, 245 R, 94

[56] References Cited

U.S. PATENT DOCUMENTS

| | | | |
|---|---|---|---|
| 3,830,058 | 8/1974 | Ainsworth | 60/39.31 |
| 3,834,157 | 9/1974 | Hoffmann | 60/39.093 |
| 3,861,139 | 1/1975 | Jones | 60/226.1 |
| 3,905,191 | 9/1975 | Matto | 60/39.092 X |
| 3,925,979 | 12/1975 | Ziegler | 60/39.093 |

FOREIGN PATENT DOCUMENTS

| | | | |
|---|---|---|---|
| 1357712 | 6/1974 | Fed. Rep. of Germany ... | 60/39.093 |
| 2038425 | 7/1980 | United Kingdom ............ | 60/39.093 |

*Primary Examiner*—Louis J. Casaregola
*Assistant Examiner*—Jeffrey A. Simenauer
*Attorney, Agent, or Firm*—Parkhurst & Oliff

[57] ABSTRACT

An anti-icing system for a rotating blunt nose bullet of a gas turbine engine uses a rotating thermosyphon effect to create a circulation within a chamber connected for rotation with the nose bullet which draws hot air from a downstream region of the engine forwards to impinge on the nose bullet over a small region close to the engine axis. This avoids complications with separate hot air supplies or electrical heaters. As shown in FIGS. 3 and 4 of the drawings, in one embodiment of the invention the chamber consists simply of a tube closed off by the nose bullet and in combination with an engine main shaft which extends to the turbine region of the engine to draw hot gas from this region. Alternatively, the chamber may extend only to the downstream end of the first compressor.

14 Claims, 5 Drawing Figures

NOSE BULLET ANTI-ICING FOR GAS TURBINE ENGINES

This is a continuation of application Ser. No. 138,143 filed Apr. 7, 1980 now abandoned.

DESCRIPTION

The present invention relates to anti-icing of rotating nose bullets of gas turbine engines.

Heating of rotating nose bullets presents particular problems. For example, electrical heaters cannot be incorporated, as they could be with static nose bullets, without the use of slip rings, or other such complications, for carrying the heater current across the interface between static and rotating parts of the engine.

Other methods have been tried, for example, ducting hot air from other parts of the engine to the nose bullet and allowing it to impinge thereon, or to form a film of hot air over the internal surface thereof. Once again this has had the disadvantages that the hot air either has been allowed to escape from the nose bullet into the air stream entering the engine compressor where it distorts both the pressure and temperature profiles of the air, or has had to be ducted away to another part of the engine to avoid heating the compressor discs. This adds complexity to the engine design.

Some shapes of nose bullet e.g. pointed, or ogival, have been found to be satisfactory without specific anti-icing provisions, but the problem still remains for blunt nose bullets, which are preferred in some engine installations because of their shorter length.

We have now found that it is possible to achieve satisfactory anti-icing of the whole of the spinning blunt nose bullet, provided that a relatively small area adjacent the axis of rotation is maintained free of ice.

We have also found that by using the temperature difference which occurs between different axial positions along the engine, energy can be made available to produce a rotating thermosyphon effect using the nose bullet as the cooler and using a region downstream of the nose bullet as the heat input. In the rotating thermosyphon the centrifugal forces on the different densities of the fluid at different temperatures creates a circulation of the fluid between the nose bullet and the hotter region and no additional ducting is required to carry the hotter fluid away after contact with the nose bullet.

According to the present invention a gas turbine engine having a nose bullet which is rotatable about the longitudinal axis of the engine is provided with a system for anti-icing the nose bullet, the system comprising a chamber connected for rotation with the nose bullet and having an end wall which is formed by at least the central region of the nose bullet lying adjacent said engine axis, the chamber further including wall means for constraining gas within it which has been cooled by contact with said central portion of the nose bullet, and which is centrifuged radially outwardly due to rotation of the chamber, to flow towards a relatively hotter region of the chamber thereby inducing gas from said relatively hotter region of the chamber to flow towards, and impinge on, the central region of the nose bullet.

Thus a rotating thermosyphon effect is established within the chamber. Although a thermosyphon is usually a closed system, in this particular anti-icing system, the chamber may be entirely closed, or may be open at the hotter end thus allowing for some mass flow into and out of the system while still producing the circulatory effect of a rotating thermosyphon.

In one form of closed system, for example, the nose bullet may form one end of a completely closed chamber, which extends rearwardly of the engine to the downstream end of the first compressor of the engine where the temperature is relatively hotter. A central tube extends forwardly from the downstream end of the chamber to the nose bullet and is connected to the nose bullet to rotate therewith. The central tube collects relatively hot air at its downstream end and directs it to impinge on the nose bullet over a small area adjacent the engine axis. The air is cooled, and as its density increases it is centrifuged into the radially outer part of the chamber and flows to the downstream end of the chamber where it is heated and enters the tube. The words upstream and downstream are used with reference to the direction of working fluid flow through the engine.

The tube is preferably closed at its downstream end and has holes in its wall to allow entry of the heated air.

In a preferred form of the invention the whole of the rotating thermosyphon effect takes place in a central tube which forms the chamber and which is connected to, and closed at one end by, a central region of the surface of the nose bullet. The tube extends rearwards to the downstream end of the engine. This system provides a very efficient anti-icing system with a minimum of additional complication. The central tube may, in this embodiment, comprise at least in part a hollow engine main shaft, which would preferably be the innermost main shaft. The downstream end of the tube may be completely blanked off, or may have an opening to allow some of the cooler air from the radially outer part of the interior of the shaft to flow out of the shaft and to allow flow of hot air into the shaft on the axis thereof.

The diameter of the tube preferably increases along its length, and may change gradually or may change in a series of steps.

Examples of the invention will now be more particularly described with reference to the accompanying drawings in which.

Figure 1:
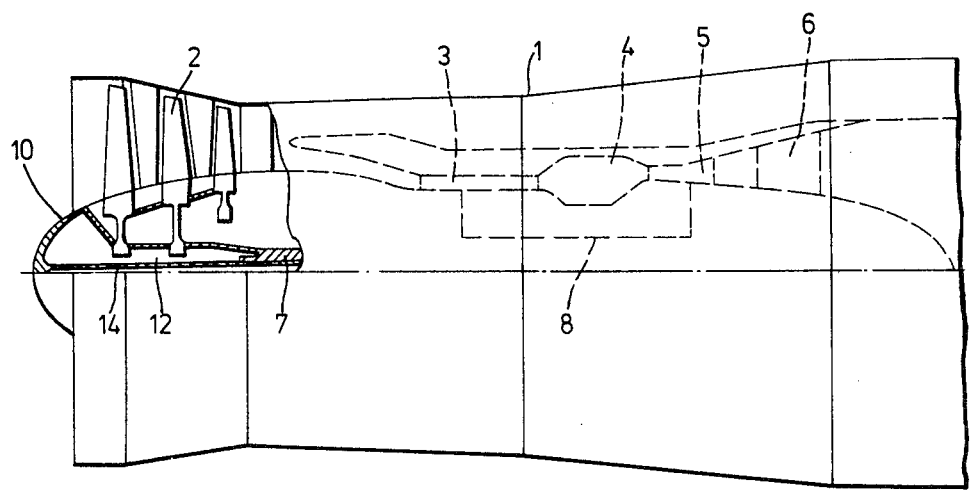
FIG. 1 is a part section through a gas turbine engine having an anti-icing system according to the present invention.
Figure 2:
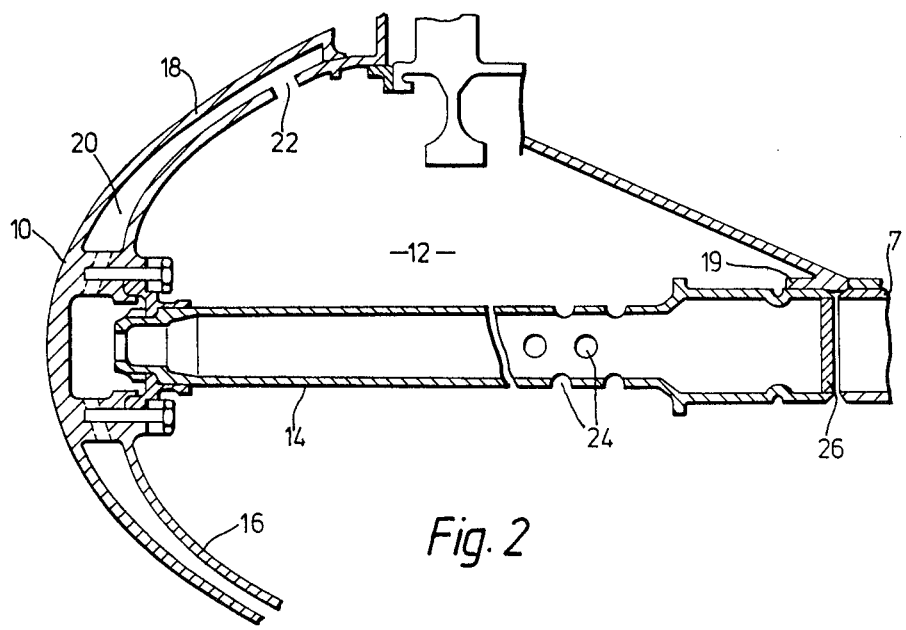
FIG. 2 is an enlarged view of the compressor and the nose bullet anti-icing system of the engine of FIG. 1.

Referring now to FIGS. 1 and 2 there is shown a bypass gas turbine engine 1 including a low pressure compressor 2 a high pressure 3, combustion equipment 4, a high pressure turbine 5, and a low pressure turbine 6. The low pressure compressor 2 is driven by the low pressure turbine 6 through a low pressure shaft 7, and the high pressure turbine 5 drives the high pressure compressor 3 through a high pressure shaft shown diagrammatically at 8. The exhaust gases produced by the engine pass to atmosphere through nozzle means (not shown) at the downstream end of the engine.

At the upstream end of the engine, and forming the radially inner wall of the annular air inlet to the low pressure compressor, is a nose bullet 10. The nose bullet 10, being subject to ice formations, requires an anti-icing system for preventing the formation of large deposits of ice which may break off and pass into the inlet to the compressor causing damage.

Tests have now shown that only the central portion of the nose bullet need be heated for anti-icing purposes, because if ice is prevented from building up on the central portion, centrifugal force will prevent excessive build up of ice on the remaining surface area. It has been found that only about three of four square inches of the nose bullet surface centered on the engine axis need be heated to keep the whole nose bullet clear of an excessive build up of ice.

In order to provide heat to the central portion of the nose bullet a rotating thermosyphon effect has been found to be effective. This uses the centrifugal force on air at different temperatures within a substantially closed system to produce a circulation of air in which the warmer air remains close to the axis of rotation while the cooler air is forced to the radially outer walls.

To provide this effect in the engine of FIG. 1, an anti-icing system has been devised which uses the rise in temperature across the length of the low pressure compressor 2 to heat air within a closed chamber 12 formed radially inwards of the compressor. A central tube 14 is provided, which is connected for rotation with the nose bullet, and which is arranged to guide the heated air to the central portion of the surface of the nose bullet 10 adjacent its axis of rotation.

Further details of the system can be seen with reference to FIG. 2 in which it can be seen that the nose bullet has inner and outer skins 16,18 defining a space 20 therebetween. The upstream end of the tube 14 is connected to the inner skin 16, and the downstream end is driven by shaft 7 through a splined connection 19. The tube communicates with the space 20 so that relatively hot air from within the tube impinges on the central portion of the outer skin 18 of the nose bullet. This air is cooled by the nose bullet and as its density increases it is centrifuged outwardly in the space 20 creating a lower pressure zone at the upstream end of the tube 14. The cooled air leaves the space 20 through a series of apertures 22 formed in the inner skin 16 and passes into the chamber 12 at the radially outer wall thereof which is defined by the forward portion of the shaft 7 which interconnects the compressor rotors.

As this air moves rearwards along the radially outer wall of the chamber it picks up heat from the wall, and as its density decreases it will tend to be pushed radially inwardly by the flow of denser, cooler air from the space 20. The heated air enters the tube 14 at the downstream end of the chamber 12 through holes 24 in the tube wall and flows forwardly to the nose bullet 10. This circulation provides a continuous supply of heated air to the central portion of the surface of the nose bullet and has been found to be effective in most conditions to maintain the nose bullet free of significant formations of ice.

The tube 14 is blanked off by a plate 26 to prevent hot gas at very high temperature from the downstream end of the engine entering the chamber 12.

To deal with harsher conditions however, which may require more heat to be supplied to the nose bullet than can be supplied by the temperature rise across the low pressure compressor, or in engine layouts in which it is not practical to use the heat supplied from a compressor, an alternative system using the basic principle of the present invention can be used. In the alternative system, which is illustrated in FIGS. 3 to 5, the central tube is completely closed by the internal surface of the nose bullet, which is now single skinned, and the tube extends rearwardly, increasing in diameter, to the turbine end of the engine where air at much higher temperature is available for heating the air in the thermosyphon and the thermosyphon effect takes place entirely within the tube.

Figure 3:
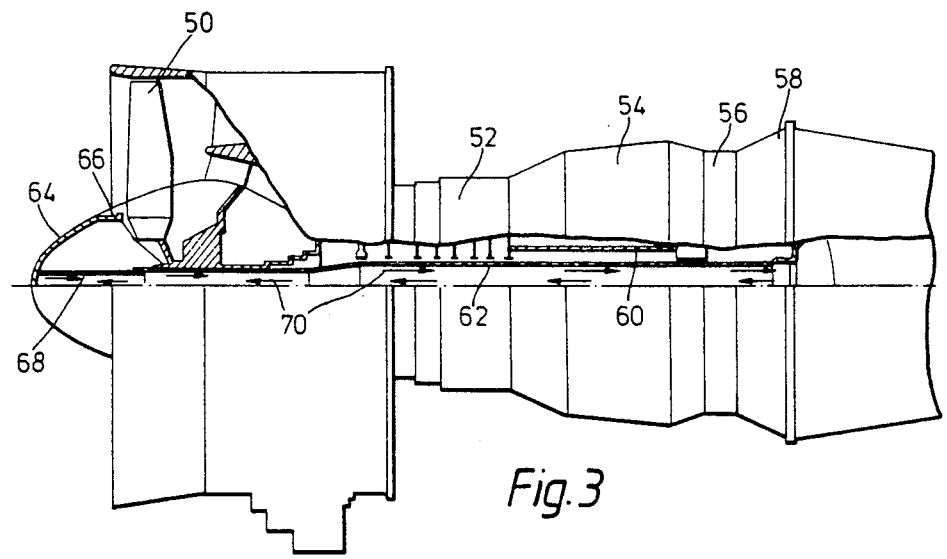
FIG. 3 is a diagrammatic view of a gas turbine engine sectioned to illustrate an alternative anti-icing system of the present invention.
Figure 4:
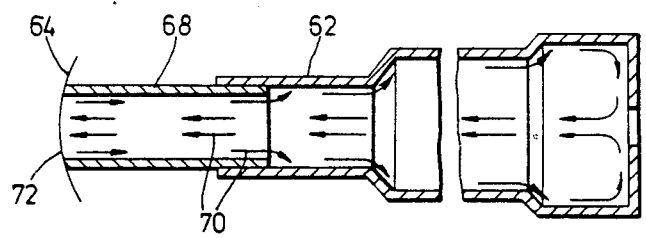
FIG. 4 is an enlarged diagrammatic representation of the shaft of the engine of FIG. 3 illustrating the thermosyphon effect.
Figure 5:
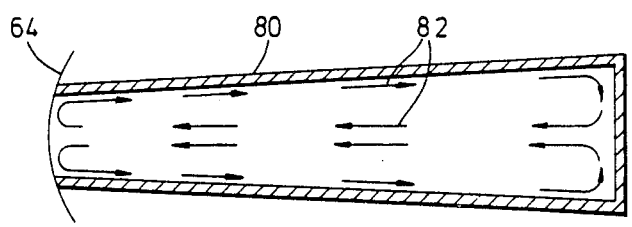
FIG. 5 is a diagrammatic representation of an alternative form of shaft.

Referring now to FIGS. 3 to 5 there is shown a gas turbine engine having a fan 50, a high pressure compressor 52, a combustion system 54, a high pressure turbine 56, and a low pressure turbine 58. The high pressure compressor 52 and the high pressure turbine 56 are drivingly interconnected by a high pressure shaft 60, and the fan 50 and the low pressure turbine 58 are drivingly interconnected by a low pressure shaft 62 which rotates co-axially within the high pressure shaft. The engine has a nose bullet 64 which is connected by bolts 66 to the fan 50 for rotation therewith.

In this embodiment of the invention the low pressure shaft 62 increases in diameter in steps from the upstream end of the engine to the downstream end, and a tube 68 is provided which is connected between the upstream end of the shaft 62 and the nose bullet 64, and is of a diameter equal to, or less than the diameter of the upstream end of the shaft 62. As can be seen more clearly in FIG. 4 the thermosyphon effect is created wholly within the tube 68 and the shaft 62, and is indicated by the arrows 70.

The tube 68 is connected to the nose bullet in such manner that it is closed at its upstream end by a region 72 of the internal surface of the nose bullet adjacent the axis of the engine. Any air in the tube thus contacts the cold nose bullet at the upstream end of the tube and is cooled. The centrifugal force on this part of the air in the tube then becomes greater than that on the warmer air elsewhere in the tube, due to the increasing density of the air as its temperature falls. The cooler air is thus centrifugal to the radially outer part of the tube, allowing more warm air near the central axis of the tube to move into contact with the nose bullet and setting up a circulation in the tube.

Where the tube is connected to the main shaft 62 there is an increase in diameter which promotes further radially outward flow of the cooled air due to the higher centrifugal force on it, and with further step changes in diameter of the shaft along its length, the cooled air is encouraged to flow rearwardly along the walls, first of the tube 68, and then of the shaft 62, until it reaches the downstream end of the shaft. During this flow the air is being heated, and when it reaches the downstream end of the shaft it picks up more heat from the hot air surrounding the shaft in this region. As the temperature of the air increases its density decreases and the centrifugal force on it is reduced. It thus becomes displaced towards the axis of the shaft by the flow of the cooler air.

Hence, in a closed or substantially closed system as shown, the heated air returns along the axis of the shaft/tube combination to the nose bullet where it is cooled and circulates again. Clearly, however, if the shaft is open at its downstream end, there will be an interchange of air as the cooler air flows out from the shaft at the wall and hot air is induced into the center of the tube. Thus, an open-ended shaft will produce a thermosyphon effect although it may not per se act as a true thermosyphon.

The system thus provides a continuous supply of hot air to the central portion of the nose bullet for anti-icing purposes, but there is no flow of the hot air into the various engine compartments at the front of the engine where it may constitute a danger by over-heating the fan disc, or the discs of the first stages of the HP compressor. Thus much hotter air can be used from the downstream end of the engine and a more effective anti-icing can be achieved.

We have found that enough heat can be transmitted by the above described system to heat a central area of the nose bullet, i.e. up to four square inches, so that no dangerous build up of ice occurs on any part of the nose bullet.

In an alternative construction illustrated diagrammatically in FIG. 5 the tube/shaft combination 80 is arranged to have a gradually increasing diameter from the front to the rear of the engine, which promotes the rearward flow of the cooler air on the inner surface of the tube/shaft wall as shown by arrows 82 and thus enhances the circulation which produces the thermosyphon effect.

We claim:

1. A gas turbine engine having a nose bullet which is rotatable about the longitudinal axis of the engine and a system for anti-icing the nose bullet, said system comprising, a chamber connected for rotation with the nose bullet, the chamber being defined by a wall means, having an upstream end and a downstream end, said wall means terminating adjacent to an upstream end wall formed by at least a central region of the nose bullet lying adjacent said axis, the wall means having a cross-sectional diameter along said longitudinal axis such that no selected cross-sectional diameter along said longitudinal axis is greater than any other cross-sectional diameter downstream thereof and said cross-sectional diameter of said upstream end being less than said cross-sectional diameter of said downstream end, said wall means extending downstream from the end wall for retaining gas within it which has been cooled by contact with said central portion of the nose bullet, and which is centrifuged radially outwardly due to rotation of the chamber, said wall means constraining the gas to flow downstream towards a relatively hotter region of the chamber thereby creating a thermosyphon effect in the gas in the chamber and inducing gas from said relatively hotter region of the chamber to flow towards, and impinge on, the end wall.

2. A gas turbine engine as claimed in claim 1 and in which the chamber comprises at least in part a hollow main shaft of the engine and includes a tube mounted co-axially with the shaft and connected between the shaft and the central region of the nose bullet for rotation therewith.

3. A gas turbine engine as claimed in claim 1 and in which the chamber comprises the combination of a central tube mounted co-axially with the longitudinal axis of the engine, and a hollow engine main shaft, one end of said tube being connected to, and closed by, a central region of the surface of the nose bullet, the other end of the tube being connected to, and communicating with, the hollow interior of the engine main shaft which extends downstream from the tube to the hot turbine region of the engine.

4. A gas turbine engine as claimed in claim 3 and in which the engine main shaft is closed at the downstream end.

5. A gas turbine engine as claimed in claim 3 and in which the engine main shaft is open at the downstream end.

6. A gas turbine engine as claimed in claim 3 and in which the diameter of the chamber increases in steps from the upstream to the downstream end.

7. A gas turbine engine as claimed in claim 3 and in which the diameter of the chamber increases continuously from the upstream to the downstream end.

8. A system for anti-icing a rotatable nose bullet of a gas turbine engine comprising:
    wall means for retaining gas rotatably mounted within a gas turbine engine defining an unobstructed chamber having a central portion and an outer portion, said wall means having an upstream end and a downstream end, said upstream end being closed by and connected to a central region of a rotatable nose bullet; said downstream end extending to a region of the gas turbine engine relatively hotter than said upstream end, said wall means having cross-sectional diameters along said longitudinal axis such that no selected cross-sectional diameter along said longitudinal axis is greater than any other cross-sectional diameter downstream thereof;
    whereby the rotation of said wall means operates to cause cooled gas to flow downstream within said outer portion towards the relatively hotter region where the gas is warmed and, due to a thermosyphon effect, the warmed gas is at least in part recirculated as it enters said central portion of the chamber and flows towards and impinges on the central region of the nose bullet, such that anti-icing of the nose bullet is provided, whereupon the gas is cooled and centrifuged radially outwardly and caused to flow downstream within said outer portion for reheating.

9. The system of claim 8 wherein said wall means is substantially tubular in configuration.

10. The system of claim 8 wherein said wall means comprises a tube connected to the nose bullet at said upstream end and a tubular shaft, said tube being connected to said tubular shaft.

11. The system of claim 10 wherein said tubular shaft is connected to a low pressure turbine.

12. The system of claim 9 or 10 wherein said wall means increases in diameter in steps from the upstream end to the downstream end such that no tubular portion of said wall means is of a greater cross-sectional diameter than another tubular portion located downstream.

13. The system of claim 8 or 10 wherein said wall means is open-ended at the downstream end.

14. A system for anti-icing a rotatable nose bullet of a gas turbine engine comprising:
    wall means defining a single unobstructed chamber completely void of barriers therein, said wall means being rotatably mounted about the longitudinal axis of the gas turbine engine and being connected to and closed at a cooler first end by a central region of the rotatable nose bullet and exposed at a hotter second end to a heated region of the gas turbine engine for creating by centrifugal forces a thermosyphon effect such that a centrally located central fluid flow of gas flows from said hotter second end to said cooler first end and a peripherally located outer fluid flow of gas which has been exposed to the cooling effect of the nose bullet flows from said cooler first end to said hotter second end, said wall means having cross-sectional diameters along said longitudinal axis such that no selected cross-sectional diameter along said longitudinal axis is greater than any other cross-sectional diameter between said selected cross-sectional diameter and said hotter second end;

whereby the rotation of said wall means operates to cause cooled gas in said outer fluid flow to flow from said cooler first end towards the relatively hotter second end where the gas is warmed and the warmed gas is at least in part recirculated as it enters said central fluid flow of the chamber and flows towards and impinges on the central region of the nose bullet, such that anti-icing of the nose bullet is provided by said warmed gas whereupon the gas is cooled and centrifuged radially outwardly and caused to again flow downstream in said outer fluid flow for reheating.

* * * * *